(12) United States Patent
Konas

(10) Patent No.: US 6,944,855 B2
(45) Date of Patent: Sep. 13, 2005

(54) SYSTEM, METHOD, AND ARTICLE OF MANUFACTURE FOR CREATING AND UPDATING AN APPLICATION USING SOFTWARE APPLICATION ELEMENTS

(75) Inventor: Marc A. Konas, Mohnton, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 657 days.

(21) Appl. No.: 10/028,094

(22) Filed: Oct. 25, 2001

(65) Prior Publication Data

US 2003/0084438 A1 May 1, 2003

(51) Int. Cl.$^7$ ................................................. G06F 9/44
(52) U.S. Cl. ........................ 717/168; 717/170; 717/177
(58) Field of Search ................................. 717/168–171, 717/174–177, 122, 173, 178; 706/14; 707/203

(56) References Cited

U.S. PATENT DOCUMENTS

| | | | | |
|---|---|---|---|---|
| 5,790,796 | A | | 8/1998 | Sadowsky .................... 395/200 |
| 5,933,647 | A | | 8/1999 | Aronberg et al. ........... 395/712 |
| 5,953,533 | A | | 9/1999 | Fink et al. ................... 395/712 |
| 6,016,394 | A | * | 1/2000 | Walker ........................ 717/104 |
| 6,047,129 | A | | 4/2000 | Frye ............................ 395/712 |
| 6,075,943 | A | * | 6/2000 | Feinman ..................... 717/175 |
| 6,167,567 | A | * | 12/2000 | Chiles et al. ............... 717/173 |
| 6,192,518 | B1 | | 2/2001 | Neal ........................... 717/11 |
| 6,195,794 | B1 | | 2/2001 | Buxton ....................... 717/11 |
| 6,199,196 | B1 | | 3/2001 | Madany et al. .............. 717/2 |
| 6,286,138 | B1 | | 9/2001 | Purcell ........................ 717/11 |
| 6,453,469 | B1 | * | 9/2002 | Jystad ......................... 717/174 |
| 6,496,977 | B1 | * | 12/2002 | Hamilton et al. ........... 717/168 |
| 6,532,543 | B1 | * | 3/2003 | Smith et al. ................. 713/201 |
| 6,609,215 | B1 | * | 8/2003 | Hamilton et al. ............ 714/15 |
| 6,782,448 | B2 | * | 8/2004 | Goodman et al. .......... 711/112 |
| 6,832,373 | B2 | * | 12/2004 | O'Neill ....................... 717/171 |
| 6,842,769 | B1 | * | 1/2005 | Kim et al. ................... 709/203 |

OTHER PUBLICATIONS

Gao et al, "Application specific data replication for edge services", ACM WWW pp 449–460, May 20–23, 2003.*
Gustafsson et al, "Dynamic on demand updating of data in real time databases system", ACM SAC, pp 846–853, Mar. 14–17, 2004.*
Olston et al, "Adaptive filters for continuous queriers over distributed data streams", ACM SIGMOD, pp 563–574, Jun. 9–12, 2003.*
McCamant et al, "Predicting problems caused by component upgrades", ACM ESEC/FSE, pp 287–296, Sep. 1–5, 2003.*
Net.Deploy Global http://www.netdeploy.com/products/ndg/introduction.
PcketSoft, Inc. http://www.pocketsoft.com/windows/features.html.
Unicycle for Smalltalk http://www.unity–software.com/html/products/unicycle/for_smalltalk.html.
How to Query FoxPro Data on the Web Using ODBC http://support.microsoft.com/support/kb/articles.

\* cited by examiner

Primary Examiner—Anil Khatri
(74) Attorney, Agent, or Firm—Alexander J. Burke

(57) ABSTRACT

A system, method, and article of manufacture are described for use in updating a target application with one or more software application data elements. In an exemplary embodiment, the system comprises a source of a plurality of application data elements suitable for updating a plurality of different target applications; a first processor for identifying and extracting selected application data elements from the source in response to user selection of a target application; and an output processor for mapping the extracted selected application data elements to corresponding file locations for replacement of corresponding data elements using mapping information associating the selected application data elements with file location data of the corresponding data elements. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

14 Claims, 3 Drawing Sheets

SYSTEM, METHOD, AND ARTICLE OF MANUFACTURE FOR CREATING AND UPDATING AN APPLICATION USING SOFTWARE APPLICATION ELEMENTS

BACKGROUND OF THE INVENTIONS

Software is often corrected or augmented after and where it is installed. Many times, these updates are applied as patches which modify only predetermined portions of the software.

However, as the augmentation and/or number of patches grows, the ability to manually apply these changes in a timely and accurate manner degrades. At times, installations may use scripts to automate or otherwise assure a correct application of the change.

Over the last several years, software applications have increased in complexity such as those that have been implemented and developed using a web deployable client/server software paradigm, including such functions as accounting, human resources, distribution and materials management application software. Lawson Associates, Inc. of St. Paul, Minn. creates and markets illustrative enterprise software solutions under the LAWSON SOFTWARE trademark that enhance financial, human resources and supply chain management. See http://www.lawson.com/. Oracle Corporation of San Francisco, Calif., SAP AG of Walldorf, Germany, and PeopleSoft Inc. of Pleasanton, Calif. also manufacturer and market similar applications.

SUMMARY

The present inventions comprise a system, method, and article of manufacture for use in updating a target application with a plurality of software application data elements. In an exemplary embodiment, the system comprises a source of a plurality of application data elements suitable for updating a plurality of different target applications; a first processor for identifying and extracting selected application data elements from the source in response to user selection of a target application; and an output processor for mapping the extracted selected application data elements to corresponding file locations for replacement of corresponding data elements using mapping information associating the selected application data elements with file location data of the corresponding data elements.

The present inventions may work in cooperation with numerous software applications, by way of example and not limitation including enterprise planning software such as that provided by Lawson Associates, Inc., Oracle Corporation of San Francisco, Calif., SAP AG of Walldorf, Germany, and PeopleSoft Inc. of Pleasanton, Calif.

However, the scope of protection is not limited by the summary of an exemplary embodiment set out above, but is only limited by the claims.

BRIEF DESCRIPTION OF THE DRAWINGS

These and other features, aspects, and advantages of the present inventions will become more fully apparent from the following description, appended claims, and accompanying drawings in which:

DETAILED DESCRIPTION OF THE PREFERRED EMBODIMENT

In general, throughout this description, if an item is described as implemented in software, it can equally well be implemented as hardware. Further, although an enterprise wide software environment is described herein as an exemplary embodiment, the present inventions are not limited to such a software environment and are limited, instead, by the claims herein below.

Figure 1:
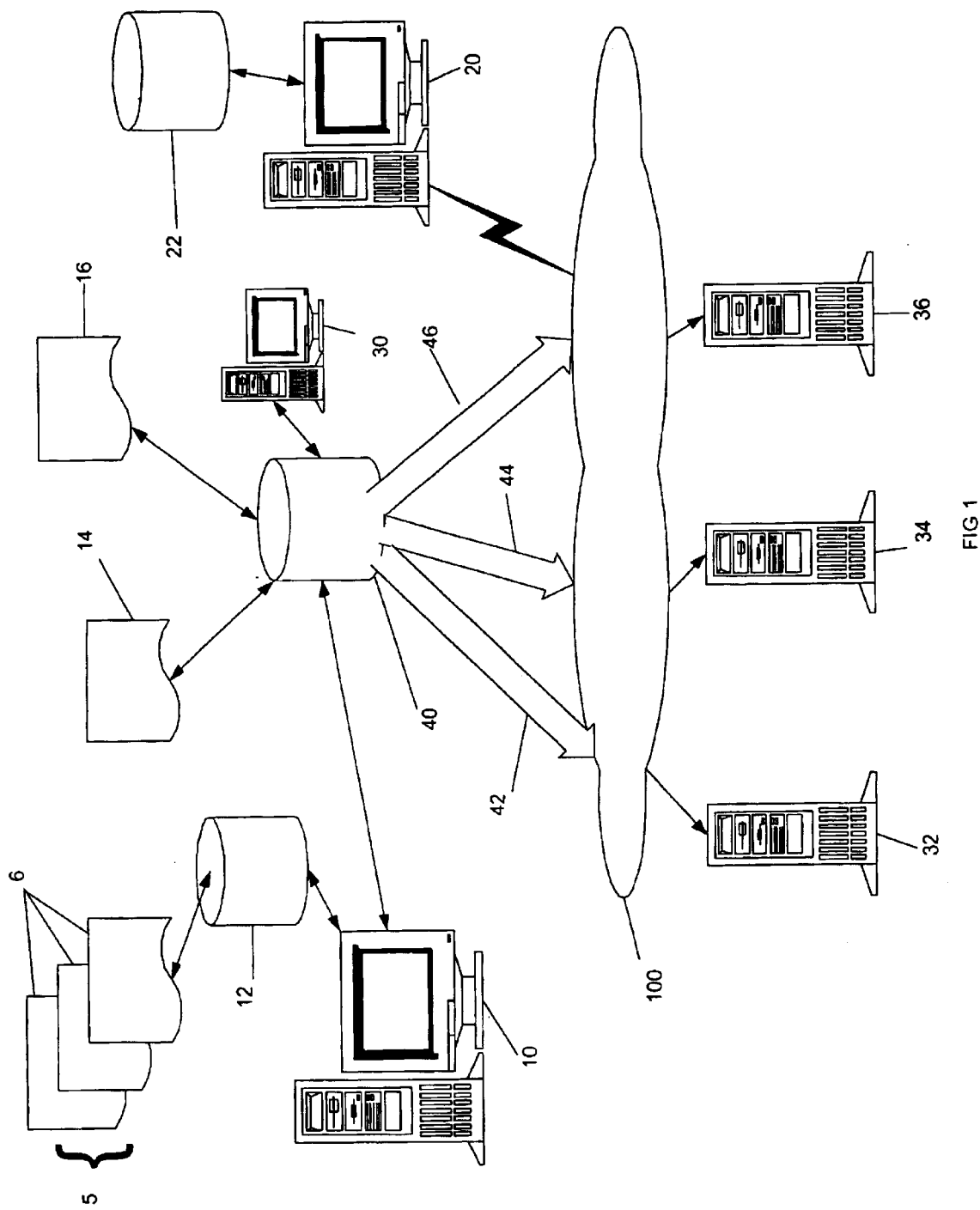
FIG. 1 is a schematic of an exemplary system of the present inventions.

Referring now to FIG. 1, a schematic representation of an exemplary embodiment, in this description target software applications will be identified by the application processors 32, 34, 36 in which those target software applications execute, i.e. by "32a, 34a, 36a." As further used herein, each target software application 32a, 34a, 36a may be different from others of the software applications 32a, 34a, 36a, have at least some software elements in common, or be the same application.

Source 5 comprises data resident or otherwise accessible to first processor 10, e.g. files on one or more persistent data stores 12. Data at source 5 further comprise a plurality of application data elements 6. Application data elements 6 may comprise individual files and/or file libraries that describe or contain totally new software, new functionality for existing software, patches to existing software, or a combination thereof. Additionally, application data elements 6 may be suitable for updating one or more target software applications 32a, 34a, 36a executing in application processors 32, 34, 36. Application processors 32, 34, 36 may be located remotely from first processor 10. Additionally, source 5 may be a single source file or may comprise a plurality of source files.

Figure 2:
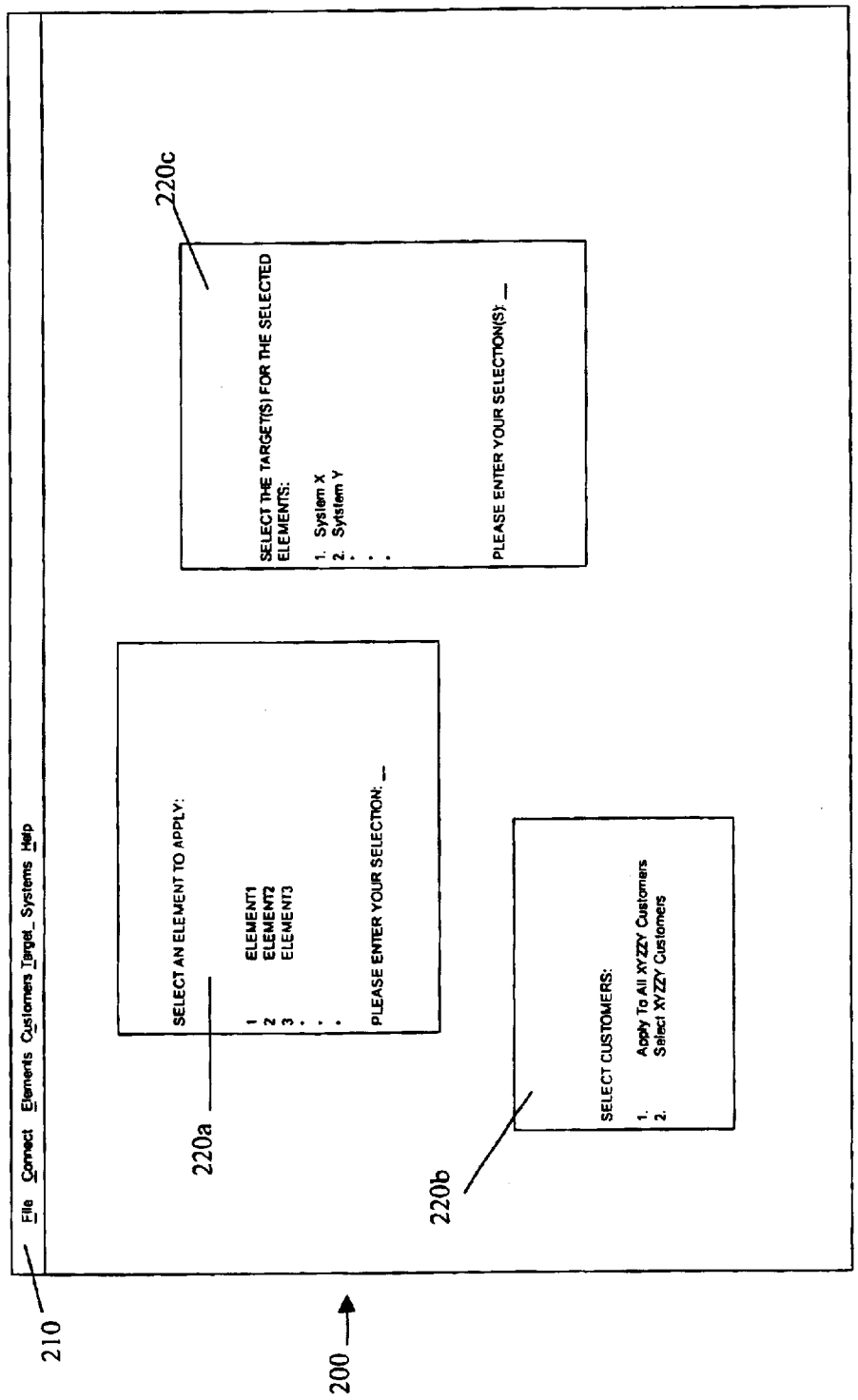
FIG. 2 is an exemplary selection menu.

Identification software executing in first processor 10 identifies and extracts desired application data elements 6 from source 5 such as in response to the user's selection of target software applications 32a, 34a, 36a via a menu such as menu form 200 (FIG. 2). In a currently envisioned alternative embodiment, identification software may additionally be triggered by external events, by way of example and not limitation comprising timers, flags, semaphores, scripts, triggers, or the like, or combinations thereof; triggered manually; or triggered by a combination thereof.

The extracted application data elements 6 may comprise a plurality of sets of selected application data elements 6 selected in response to user selection of a corresponding plurality of target software applications 32a, 34a, 36a. Selection criteria may be based on application processor 32, 24, 26 and/or customer parameters. Additionally, the extracted application data elements 6 may comprise a plurality of sets of programmatically selected application data elements 6 that are selected because they are associated with the corresponding plurality of target software applications 32a, 34a, 36a.

The extracted selected application data elements 6 will be used to replace corresponding data elements 6 existing in current software application 32a, 34a, 36a. Output processor 30 may be used to map the extracted selected application data elements 6 to corresponding file locations such as at data store 40. Output processor 30 may use mapping information associating the selected application data elements with the file locations of corresponding data elements 6, by way of example and not limitation including customer configuration data 14 and software picklists 16. Additionally, output processor 30 may copy the extracted selected application data elements 6 to their corresponding file locations at application processors 32, 34, 36. In exemplary embodiments, first processor 10 and output processor 30 may be different computers or may be different software processes executing in the same computer, e.g. first processor 10.

Authorization software, which may be software executing at output processor 30 or an additional processor, by way of example and not limitation such as computer 20, may be present to inhibit replacement of corresponding data elements 6 in response to predetermined criteria. In an exemplary embodiment, the criteria comprise at least one of billing information, user identification codes, user passwords, detection of a data element error, capabilities of processor 32, 34, 36, software environments such as at processor 32, 34, 36, and the like, or combinations thereof. In such an environment, the authorization software will act as a gatekeeper, allowing selected target computers, e.g. 32, that meet predetermined authorization criteria to receive and install data elements 6 while keeping other potential target computers, e.g. 34, that do not meet the predetermined authorization criteria to be excluded from the update.

Referring now to FIG. 2, an exemplary selection menu, a menu generator (not shown in FIG. 1) may be used to initiate a display of a menu 200 such as at first processor 10 (FIG. 1). The menu generator may query or otherwise determine available data in source 5 as well as available customers and application processors 32, 34, 36 and data regarding the customers and application processors 32, 34, 36 to determine which updates are available as well as which target applications 32a, 34a, 36a are available to receive the updates. The menu generator may then configure presentation menus accordingly, such as menu 200.

Menu 200 may be used to allow a user with appropriate authority to select target applications 32a, 34a, 36a. These selections may be based on predetermined selection criteria which may include at least one of target application identification codes, target application version codes, and target application geographical associations. In an exemplary manual mode of selection using a menu shown as an electronic form 200, a user may indicate a desired set of selections such as by using menu bars 210 and/or dialogs 220. Electronic form 200 may further comprise options to allow additional selection criteria data. By way of example and not limitation, these criteria may include application or environment criteria such as billing information or support level information. At least a portion of these criteria may be received from remote source 20 such as through data communications links such as through the Internet 100 (shown in FIG. 1).

Electronic menu form 200 may take many forms, as will be familiar to those of ordinary skill in the software arts. In FIG. 2, electronic form 200 comprises one or more dropdown selections from menu bar 210 and dialog boxes 220 that allow a user to specify selection criteria data. By way of example and not limitation, dialog 220a may be present to allow a user with appropriate authority to designate one or more application data elements 6 to apply. As will be understood by those of ordinary skill in the computer arts, locations of source 5 (FIG. 1) may be identified such as with menu 210, dialog 220a, or a combination thereof. In like fashion, dialog 220b, or any dialog 220, may be present or invoked such as from menu bar 210, function keys (not shown in the figures), hot regions, buttons, or the like, to provide for selection of one or more customers. Dialog 220c may also be present to select one or more targets 32, 34, 36 (FIG. 1) for application data elements 6 (FIG. 1) selected. As will be familiar to those of ordinary skill in the art, other application or environment criteria such as billing information or support level information may be presented, such as in response to a dialog 220 or menu 210 selection.

Figure 3:
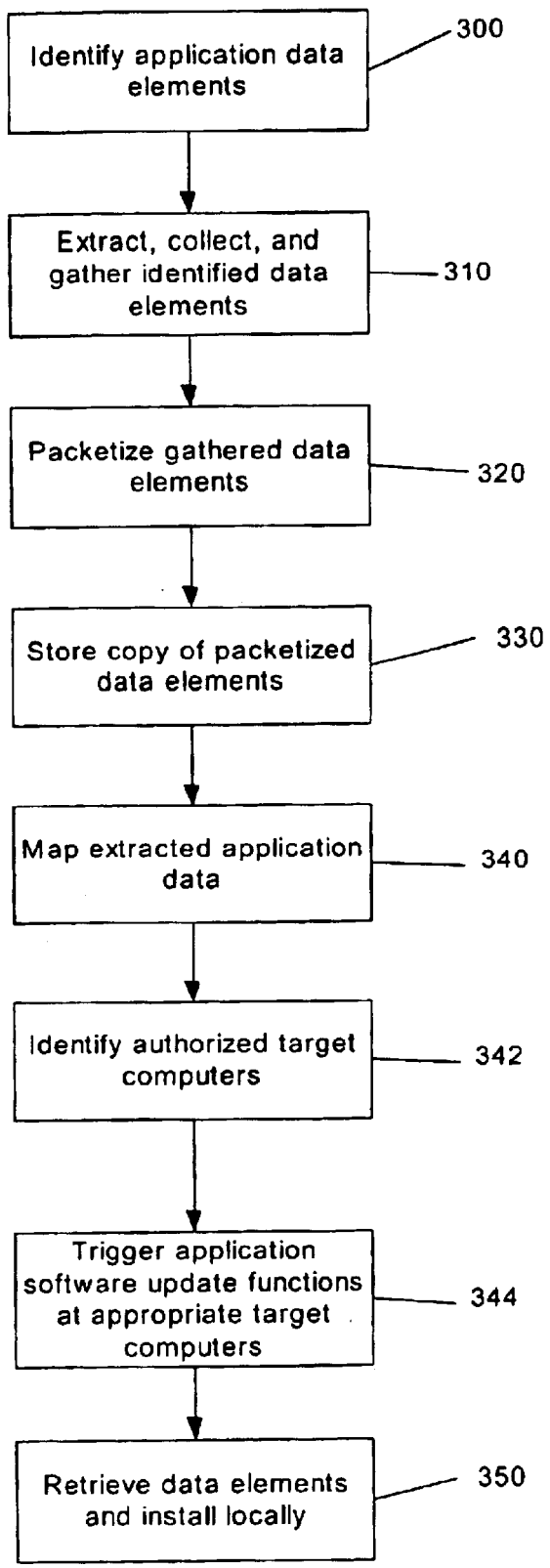
FIG. 3 is a block diagram of an exemplary embodiment of the present inventions.

In the operation of an exemplary embodiment, referring now to FIG. 1 and FIG. 3, a block diagram of an exemplary embodiment of the present inventions, one or more application data elements 6 (FIG. 1) to be applied to a targeted software application 32a, 34a, 36a (FIG. 1) resident in a application processor such as 32, 34, 26 (FIG. 1) are identified 300 and then extracted, collected, and gathered 310. A script, or other utility, function, or module as will be familiar to those of ordinary skill in the software arts, may be used to provide an ability to identify or otherwise extract selected application data elements 6 from source 5.

The gathered application data 6 (FIG. 1) may be further placed into software packets 320 (FIG. 3) such as at first computer 10 (FIG. 1) or output processor 30 (FIG. 1), e.g. at step 330 (FIG. 3). The targeted software applications 32a, 34a, 36a (FIG. 1) may further comprise an integrated utility for applying such packets or may have an associated utility to apply such packets locally to the targeted software applications 32a, 34a, 36a (FIG. 1). A user may indicate a desired set of selections such as by using electronic menu form 200 (FIG. 2).

Once selected and collected, selected application data elements 6 may be copied and stored 330 (FIG. 3) to a separate, predetermined storage location such as persistent data store 40 (FIG. 1). By way of example and not limitation, in some software environments scripting languages may be used to create software picklists 16 (FIG. 1) to extract application data elements 6 (FIG. 1) and copy them to appropriate locations on a server, e.g. processor 30 (FIG. 1). In currently envisioned alternative embodiments, the predetermined storage location may be an application service provider (not shown in the figures) as that term will be familiar to those of ordinary skill in the Internet arts.

Once the software application data elements 6 (FIG. 1) are placed into an appropriate storage location, application software update functions may be triggered 344 (FIG. 3) such as at application processors 32, 34, 36 (FIG. 1) for local installation 350 (FIG. 3). Additionally, authorization software, e.g. software executing at output processor 30 (FIG. 1), may selectively permit triggering of application software update functions only at those computers that meet the update criteria, e.g. step 342 (FIG. 3).

In an exemplary embodiment, the update functions may further be capable of invoking various external processes that may be required during the software update that are not part of the update functions, by way of example and not limitation in an exemplary embodiment start and stop commands for the one or more software applications 32a, 34a, 36a (FIG. 1) to be updated. In the preferred embodiment, application of the selected application data elements 6 (FIG. 1) is automated as automation lends itself to a more accurate and more complete installation of the application data elements 6 (FIG. 1) in their correct order.

In a currently envisioned alternative embodiment, the present inventions may be used to aid in creating application software with adaptively selectable functions. In such an embodiment, source 5 (FIG. 1) comprises a plurality of application data elements 6 (FIG. 1) corresponding to a plurality of functional elements. In this exemplary embodiment, in response to user selection of target application functions, after first processor 10 (FIG. 1) identifies and extracts selected application data elements 6 (FIG. 1) from source 5 (FIG. 1) such as a steps 300 and 310 (FIG. 3), output processor 30 (FIG. 1) maps 340 (FIG. 3) the extracted selected application data elements 6 (FIG. 1) to corresponding file locations at application processors 32, 34, 36 (FIG. 1). Using mapping information that associates the selected application data elements 6 (FIG. 1) with file location data of the corresponding data elements, when the targeted applications 32a, 34a, 36a (FIG. 1) are updated, new or modified target software applications 32a, 34a, 36a (FIG. 1) are thus created that comprise the user selected functions.

It will be understood that various changes in the details, materials, and arrangements of the parts which have been described and illustrated above in order to explain the nature of these inventions may be made by those skilled in the art without departing from the principle and scope of the inventions as recited in the following claims.

What is claimed is:

1. A system for updating a target application with adaptively selectable functions provided by a corresponding plurality of software application data elements, comprising:
   a. a source of a plurality of application data elements corresponding to a plurality of individually user selectable functions of a particular target application and suitable for updating a plurality of different target applications;
   b. a first processor for identifying and extracting selected application data elements from the source in response to user selection of an individual function from said plurality of individually user selectable functions of said particular a target application; and
   c. an output processor for mapping the extracted selected application data elements to corresponding file locations using mapping information associating the selected application data elements with file location data of the corresponding data elements.

2. A system according to claim 1, further comprising a menu generator for initiating display of a menu supporting user selection of a target application based on at least one of (a) target application identification code, (b) target application version code, and (c) target application geographical association.

3. A system according to claim 1 further comprising an authorization processor for inhibiting replacement of corresponding data elements in response to at least one of (a) billing information, and detection of an error in a data element corresponding to said individual function.

4. A system according to claim 1 wherein the output processor copies the extracted selected application data elements for providing said individual function of said particular target application to the corresponding file locations.

5. A system according to claim 1 wherein:
   d. the first processor identifies and extracts a plurality of sets of selected application data elements in the source file in response to user selection of a corresponding plurality of target applications; and
   e. the output processor maps the sets of extracted selected application data elements to corresponding locations of the plurality of target applications.

6. A system according to claim 1, wherein the source comprises at least one source file and the first processor identifies and extracts selected application data elements in response to user selection of said individual function from said plurality of individually user selectable functions of said particular target application functions via a menu.

7. A system for use in creating application software with adaptively selectable functions provided by a corresponding plurality of software application data elements, comprising:

a. a source of a plurality of application data elements corresponding to a plurality of individually user selectable functions of a particular target application;
   b. a first processor for identifying and extracting selected application data elements from the source in response to user selection of a plurality of individual functions from said plurality of individually user selectable functions of said particular target application; and
   c. an output processor for mapping the exit-acted selected application data elements to corresponding file locations for creation of a target application with user selected functions using mapping information associating the selected application data elements with file location data of the corresponding data elements.

8. A system according to claim 7, wherein the first processor identifies and extracts selected application data elements in response to user selection of target application functions determined via a displayed menu.

9. A system according to claim 8, wherein the menu is an electronic form that includes user billing information received from a remote source.

10. A method of updating software applications with adaptively selectable functions, comprising:
    a. identifying an application data element to be applied to a targeted software application resident in a targeted application computer in response to user selection of an individual function from a plurality of individually user selectable functions of said targeted software application;
    b. extracting the identified application data element from a source of application data elements;
    c. storing the extracted application data element on a persistent data store;
    d. making the extracted application data element available to the targeted application computer; and
    e. installing the extracted application data element at the targeted application computer to provide said individual user selected function.

11. The method of claim 10 wherein step (d) further comprises:
    i. identifying mapping information that associates the extracted application data clement with predetermined file location data for a corresponding data element at the targeted application computer; and
    ii. mapping the extracted application data element by an output processor to a corresponding file location at the targeted application computer using the mapping information.

12. The method of claim 10, wherein step (d) further comprises:
    i. accessing an authorization processor,
    ii. identifying the targeted application computer to the authorization processor; and
    iii. makiog the extracted application data element available to the targeted application computer only if the authorization processor approves the targeted application computer for installation of the extracted application data element.

13. The method of claim 12 wherein the authorization processor approves the targeted application computer using predetermined authorization criteria.

14. A computer program embodied within a computer-readable medium created using the method of claim 10.

* * * * *

UNITED STATES PATENT AND TRADEMARK OFFICE
CERTIFICATE OF CORRECTION

PATENT NO. : 6,944,855 B2
DATED : September 13, 2005
INVENTOR(S) : Marc A. Konas It is certified that error appears in the above-identified patent and that said Letters Patent is hereby corrected as shown below:

<u>Column 5,</u>
Line 28, delete "a".
Line 44, replace "and" with -- and (b) --.

<u>Column 6,</u>
Line 9, replace "exit-acted" with -- extracted --.
Line 56, replace "makiog" with -- making --.

Signed and Sealed this

Fifteenth Day of November, 2005

JON W. DUDAS
*Director of the United States Patent and Trademark Office*